United States Patent [19]

Richter et al.

[11] 4,410,563

[45] Oct. 18, 1983

[54] REPELLENT COATINGS FOR OPTICAL SURFACES

[75] Inventors: Herbert P. Richter; Eugene J. Dibble, both of Ridgecrest, Calif.

[73] Assignee: The United States of America as represented by the Secretary of the Navy, Washington, D.C.

[21] Appl. No.: 351,059

[22] Filed: Feb. 22, 1982

[51] Int. Cl.$^3$ .................. C03C 17/30; G02B 1/10
[52] U.S. Cl. .................. 422/108; 427/163; 427/164; 427/165; 427/169
[58] Field of Search ............. 427/108, 163, 164, 165, 427/169

[56] References Cited

U.S. PATENT DOCUMENTS

| | | | |
|---|---|---|---|
| 3,422,131 | 1/1969 | Pittman et al. | 106/2 |
| 3,460,981 | 8/1969 | Keil et al. | 106/2 |
| 3,592,669 | 7/1971 | Baker et al. | 106/2 |
| 3,620,820 | 11/1971 | Hess | 106/2 |
| 3,623,895 | 11/1971 | Nitzsche et al. | 106/2 |
| 3,719,696 | 3/1973 | Jonas et al. | 106/13 |
| 3,786,089 | 1/1974 | Rondestvedt | 106/2 |
| 3,900,672 | 8/1975 | Hammond et al. | 427/165 X |
| 3,944,587 | 3/1976 | Katsushima et al. | 106/13 |
| 4,029,842 | 6/1977 | Yoshida et al. | 427/164 X |
| 4,152,165 | 5/1979 | Langager et al. | 106/2 |

OTHER PUBLICATIONS

Information About Polish Ingredients, Bulletin 22-24-0A-78, Dow Corning Corp., Midland, Michigan, (1978).

New Product Information, Dow Corning 531 Fluid, Bulletin 22-763-80, Dow Corning Corp., Midland, Michigan, (1980).

*Primary Examiner*—James R. Hoffman
*Attorney, Agent, or Firm*—Robert F. Beers; W. Thom Skeer; Bruce H. Cottrell

[57] ABSTRACT

Water repellent coatings for optical elements such as lenses and windshields. Coatings for uncoated glass, glass having a magnesium fluoride antireflective coating, and glass having an electrically conductive coating of a mixture of indium oxides and tin oxides are applied by applying compositions containing chloromethylsilanes, Dow Corning 531 and 536 fluids, or N, beta-aminoethyl-gamma-aminopropyltrimethylsilane and a perfluorocarboxylic acid to the surface where water repellent coatings are desired. Dow Corning 531 and 536 fluids are described as aminofunctional polydimethylsiloxane copolymers. Hydrolysis and condensation reactions in the presence of water at the surface to be coated result in a durable polymeric coating bonded to the surface.

16 Claims, No Drawings

REPELLENT COATINGS FOR OPTICAL SURFACES

BACKGROUND OF THE INVENTION

This invention relates to the field of chemistry. More particularly, this invention relates to the field of protective water repellent coatings. This invention includes methods for coating optical elements to provide protective, water repellent surfaces, and the resulting coated articles. By optical element is meant an element such as a lens or windshield made of light or electromagnetic radiation transmitting material such as glass.

It is known in the optical arts to coat lenses, etc. with inorganic substances in order to enhance performance of the lens. Magnesium fluoride ($MgF_2$), for example, has been employed as a coating to impart antireflective qualities to a lens and thus increase its transmissivity, or light gathering capabilities.

Optical glass surfaces exposed to rain or sea water cannot transmit images without distortion if water accumulates on the surface. Further, if water is allowed to freeze, further distortion is produced. Also, accumulated ice may reduce flight performance if the optical element makes up the forward portion of a flight vehicle. Coating compositions are known which render a glass optical element water repellent. Many of these repellent coatings, however, are not effective on optical elements which are coated with magnesium fluoride or other material. Optical elements having such coatings are not only subject to the same degradation of performance as the uncoated elements from water exposure but the salt remaining from evaporated salt water attacks the coating materials.

It is known in the art to provide water repellent compositions for coating optical elements having magnesium fluoride coatings. One such composition comprises a mixture of hydrocarbon wax and mixed isomers of long chain alkyl or alkenylsuccinic acid long chain alkylmonoamides. It is desirable, however, to provide a coating formulation having improved durability.

Another requirement for water repellent coating compositions has arisen due to the development of optical systems having electrically conductive indium-tin oxide (ITO) coatings. ITO coatings are composed of a mixture of indium oxides and tin oxides which have variable electrical resistance depending upon the oxidation state of the materials. Such a coating is useful for coating sensor optics in guided missile applicatons. No prior art repellent coatings are known to be effective or compatible with ITO coatings.

SUMMARY OF THE INVENTION

It is an object of the present invention to provide new methods for providing water repellent coatings.

It is also an object to provide new methods for providing a transparent water repellent coating on optical glass surfaces which have been coated with an antireflection film such as magnesium fluoride.

It is a further object to provide a transparent water repellent coating which is useful for each of the uncoated optical glass surfaces and those coated with magnesium fluoride or indium-tin oxide.

The above and other objects are accomplished in the present invention which comprises new methods for providing transparent water repellent coatings on optical glass surfaces which are uncoated or coated with a magnesium fluoride antireflection film or an indium-tin oxide conductive film and coated optical elements produced according to such methods.

DESCRIPTION OF THE PREFERRED EMBODIMENT

New methods have been developed for providing water repellent coatings for optical elements which are effective and compatible with magnesium fluoride or indium-tin oxide. Evidence indicates that the compositions of the present invention actually chemically bind with water molecules which are hydrogen bonded to the optical surface. These compositions also cross link to form a polymeric film.

Compositions found useful for forming water repellent coatings on glass or magnesium fluoride coated glass are dichlorodimethylsilane, trichloromethylsilane, and mixtures of dichlorodimethylsilane and trichloromethylsilane. Compositions found useful for forming water repellent coatings for glass, magnesium fluoride coated glass, and indium-tin oxide coated glass include a mixture of a perfluorocarboxylic acid and N, beta-aminoethyl-gamma-aminopropyltrimethoxysilane (Dow Corning Z-6020), and a mixture of Dow Corning 531 and Dow Corning 536 fluids.

The dichlorodimethylsilane and trichloromethylsilane can be employed in any desired relative proportions or individually, preferably in equal volumes in solution with a solvent such as hexane. Reaction by hydrolysis with water molecules ionically bonded to the optical element surface and condensation in the presence of free water molecules present near the surface provides for cross linking to form a water repellent polymer coating.

The Dow Corning 531 and 536 fluids are commercially available proprietary formulations of Dow Corning Corporation described as aminofunctional polydimethylsiloxane copolymers. They combine the alkoxy reactivity of a methoxy group and an organofunctional amine group attached to the same silicone backbone. They may be used individually or mixed in any desired proportions, the preferred formulation being a volume ratio of about three parts 531 and one part 536. The fluids are preferably employed in a solvent such as isopropyl alcohol and an organic acid having substantial acidity that does not, in itself, react at an optical element surface, preferably acetic acid, is useful to establish a desired pH. Although the exact preferred pH range for formation of water repellent coating is not known, an initial pH of about 4.5, which increases as acetic acid evaporates from the reacting solution allows the reaction to take place at an optimum, although undetermined pH level. Reaction by hydrolysis with water molecules ionically bonded to the optical element surface, and condensation in the presence of free water molecules present near the surface provides for cross linking to form a silicone-like water repellent polymer coating.

The N, beta-aminoethyl-gamma-aminopropyltrimethoxysilane commercially available as Dow Corning Z-6020 fluid is reacted with a perfluorocarboxylic acid to form a copolymer according to the following reaction scheme:

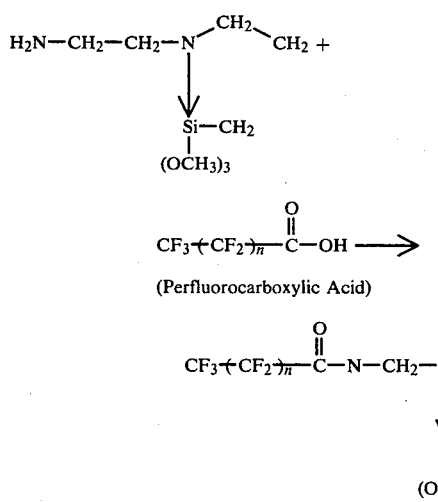

where n=4–12 with 8–10 preferred. The resulting copolymer hydrolyzes with water molecules ionically bonded at the optical element surface and cross polymerizes in the presence of free water molecules to form a Teflon-like water repellent polymer coating.

The reaction solution preferably contains equimolar amounts of Z-6020 fluid disposed in a solvent such as ethanol-water and an organic acid having substantial acidity that does not, in itself, react at an optical element surface, preferably acetic acid, to establish a desired pH. Although the exact preferred pH range for formation of water repellent coating is not known, an initial pH of about 4.2 which increases as acetic acid evaporates from the reacting solution allows the reaction to take place at an optimum, although undetermined pH level.

In the following examples glass specimens having both coated and uncoated surfaces were rinsed in tap water, soaked in carbon tetrachloride or 1,1, 1-trichloroethane followed by soaking in dimethylformamide or a detergent, rinsed in tap water, immersed in boiling distilled water and air-dried to provide clean surfaces thereon. The degree of water repellence of the specimen surfaces before and after treatment by the water repellent were determined by the measurement of the contact angle.

The measured contact angle is that angle included between the specimen surface and a plane drawn intersecting said surface and tangent to the free surface of the liquid drop at a point that surface intersects with the specimen surface where said angle includes the liquid drop. Values reported are the angles existing 60 seconds after the drop is placed on the surfaces. Calibration using Teflon (fluorinated ethylene-propylene and tetrafluorethylene) surfaces indicated a contact angle of 109 degrees. Contact angles of distilled water on glass, MgF$_2$, and ITO specimens after cleaning were 15, 28.5, and 37.2 degrees, respectively. Application of the water repellent coating was carried out at ambient pressure and at room temperature except where specifically noted.

EXAMPLE 1

MgF$_2$ coated glass specimens and ITO coated glass specimens were immersed in a solution of 25/25/50 volume percent dichlorodimethylsilane/trichloromethylsilane/hexane, respectively, reacted 4 hours, and rinsed twice with hexane. The specimens were then immersed in solution of 50/45/5 volume percent toluene/ethanol/water, respectively, for 1 hour and then air-dried 24 hours. On evaluation, the ITO film had turned a milky white color and the surface resistance had increased from original about 20 ohms per square to about 30,000 ohms per square. The MgF$_2$ coated and uncoated glass surfaces remained transparent and had contact angles of 106 and 107.5 degrees, respectively.

The results of this test indicate that these silanes are effective for coating magnesium fluoride coated and uncoated glass, but ineffective for coating ITO coated glass. The discoloration of the ITO coating is attributed to formation of hydrochloric acid during the reaction at the specimen surface and subsequent attack on the ITO by the produced acid. The large increase in electrical resistance of the ITO coating further indicated degradation of the coating. The high contact angles for glass and MgF$_2$ indicated an effective water repellent surface was formed on these materials.

EXAMPLE 2

Immersed MgF$_2$ and ITO specimens in a solution of 8.8 ml of Dow Corning 536 solution and 0.6 ml of acetic acid in 10.0 ml of isopropyl alcohol for 30 minutes. Rinsed specimens with isopropyl and air dried for 2 days. The contact angles were 93, 95, and 90 degrees on ITO, MgF$_2$, and glass surfaces, respectively.

EXAMPLE 3

A solution of 4 ml of Dow Corning 536, 12 ml of Dow Corning 531, 1.1 ml of acetic acid and 20 ml of isopropyl alcohol was prepared. Additional acetic acid was added (0.4 ml) to adjust the pH at 4.5. MgF$_2$ and ITO on glass specimens were immersed in a 5 wt percent solution of the above in 100 ml of water and allowed to stand for 30 minutes. The solution was turbid. The specimens were then rinsed in isopropyl alcohol and air dried for 2 days. The contact angles were 96, 102, and 99 degrees for the ITO, MgF$_2$, and glass surfaces, respectively.

EXAMPLE 4

A solution was prepared of 4 ml of Dow Corning 536 and 12 ml of Dow Corning 531 which were added to a solvent mixture of 10 ml each of n-octane and isopropyl alcohol and 1.1 ml of acetic acid. The pH was adjusted after mixing to 4.5. ITO specimens were treated with above concentrated solution by rubbing with solution-soaked terrycloth for 5 minutes. The surfaces were allowed to stand for 5 minutes and were then rinsed with isopropyl alcohol. Both surfaces appeared gummy before rinsing but appeared clear after rinsing. The samples were allowed to air dry overnight. The contact angles were 103.5 and 100 degrees on the ITO and glass surfaces, respectively.

EXAMPLE 5

A solution of perfluoro-n-octanoic acid (0.05 mole) and N, beta-aminoethyl-gamma-aminopropyltrimethoxysilane (Dow Corning Z-6020) (0.05 mole) in isopropyl alcohol was prepared. The solution was allowed to stand for 24 hours. ITO and MgF$_2$ coated specimens were then immersed in the solution for 4 days. On removal an oily film was removed by two rinses in isopropyl alcohol in an ultrasonic cleaner. The samples were oven cured at 150° C. for 1 hour and in the following contact angle studies there was no evidence of a hydrophobic coating.

EXAMPLE 6

A solution of perfluorodecanoic acid (0.05 mole) and Dow Corning Z-6020 fluid (0.05 mole) in a solvent mixture of 150 ml of absolute ethanol and 50 ml of water. The pH of the solution was lowered to 4.2 with acetic acid. The solution was stirred for 30 minutes. ITO and $MgF_2$ coated specimens were then immersed in the solution for 70 minutes, rinsed with absolute ethanol and air-dried. The coating was cured at 146° C. for 30 minutes and then cooled. The contact angles were 86, 92, and 76 degrees on the $MgF_2$, ITO, and glass surfaces, respectively.

EXAMPLE 7

The solution of example 6 was prepared and applied to specimen surfaces with a terrycloth towel by wiping the saturated cloth on the surface for 5 minutes and allowing it to air-dry overnight. The surfaces were cured at 146° C. for 1 hour and cooled. The contact angles were 101 and 96 degrees on the ITO and $MgF_2$ surfaces, respectively.

Subsequent flight tests of flight vehicles wherein the nose portion comprised a coated optical element, i.e., a glass shield, were carried out in a salt water mist environment. Under flight conditions, where there is considerable erosive force due to air speed, the silicone-like coating, formed from mixtures of Dow Corning 531 and 536 silicone oils according to example 4 above, proved to be superior to the Teflon-like coating, formed according to example 7, in durability.

For applications less severe than high speed flight, such as for camera or binocular applications, the coating formed of chloromethylsilanes as in example 1, the silicone-like coating of example 4, and the Teflon-like coating of example 7 would all have adequate durability during use.

In summary, novel methods have been developed to provide effective and durable water repellent coatings suitable for optical elements and which are compatible with uncoated glass surfaces, magnesium fluoride coated surfaces, and indium-tin oxide coated surfaces.

Obviously many modifications and variations of the present invention are possible in light of the above teachings. It is therefore to be understood that within the scope of the appended claims the invention may be practiced other than as specifically described.

What is claimed is:

1. A method for applying a water repellent coating to a surface of an optical element comprising:
applying fluid comprising a composition selected from the group consisting of chloromethylsilanes, a mixture of aminofunctional polydimethylsiloxane copolymers, and a mixture of a perfluorocarboxylic acid and N,beta-aminoethyl-gamma-aminopropyltrimethoxysilane to said surface of said optical element; and
allowing said composition to react at said surface of said optical element to form said repellent coating thereon.

2. The method of claim 1 wherein said composition of chloromethylsilanes comprises a solution of dichlorodimethylsilane and trichloromethylsilane.

3. The method of claim 2 wherein said composition of chloromethylsilanes comprises a solution of one part by volume dichlorodimethylsilane, one part by volume trichloromethylsilane and two parts by volume of hexane.

4. The method of claim 3 wherein said solution is applied to said optical element by being immersed in said solution for a period of four hours, rinsed with hexane, immersed in solution comprising toluene, ethanol, and water for one hour, and allowed to dry.

5. The method of claim 2 wherein said optical element is composed of glass.

6. The method of claim 2 wherein said optical element surface comprises an outer layer of magnesium fluoride, said water repellent coating being applied upon said layer of magnesium fluoride.

7. The method of claim 1 wherein said composition comprising a mixture of aminofunctional polydimethylsiloxane copolymers further comprises a solution of about sixteen parts by volume of a mixture of said aminofunctional polydimethylsiloxane copolymers, ten parts by volume n-octane, ten parts isopropyl alcohol, and one part acetic acid, said composition adjusted to a pH of about 4.5 with acetic acid.

8. The method of claim 7 wherein said solution is applied to said optical element surface by rubbing said surface with an applicator soaked with said solution, said surface being allowed to stand for about 5 minutes to carry out said reaction and then rinsed with isopropyl alcohol and allowed to dry.

9. The method of claim 1 wherein said composition comprising a mixture of aminofunctional polydimethylsiloxane copolymers is applied to said optical element surface, said optical element being made of glass.

10. The method of claim 1 wherein said composition comprising a mixture of aminofunctional polydimethylsiloxane copolymers is applied to said optical element wherein said optical element surface comprises a layer of magnesium fluoride, the water repellent coating being formed upon said layer of magnesium fluoride.

11. The method of claim 1 wherein said composition comprising a mixture of aminofunctional polydimethylsiloxane copolymers is applied to said optical element wherein said optical element surface comprises a layer of inorganic material comprising a mixture of indium oxides and tin oxides, the water repellent coating being formed upon said layer of inorganic material.

12. The method of claim 1 wherein said composition comprising a mixture of a perfluorocarboxylic acid and N, beta-aminoethyl-gamma-aminopropyltrimethoxysilane further comprises a solution of equimolar parts of perfluorodecanoic acid and N, beta-aminoethyl-gamma-aminopropyltrimethoxysilane in a solvent mixture of one part water and three parts ethanol by volume adjusted to a pH of about 4.2 with acetic acid.

13. The method of claim 12 wherein said solution is applied to said optical element surface by wiping said surface with an applicator soaked with said solution, said surface being allowed to dry, said dried element surface being cured at a temperature of about 146° C. and allowed to cool.

14. The method of claim 1 wherein said composition comprising a perfluorocarboxylic acid and N, beta-aminoethyl-gamma-aminoproyltrimethoxy silane is applied to said optical element surface, said optical element being composed of glass.

15. The method of claim 1 wherein said composition comprising a perfluorocarboxylic acid and N, beta-aminoethyl-gamma-aminoproyltrimethoxy silane is applied to said optical element wherein said optical element surface comprises a layer of magnesium fluoride, the water repellent coating being formed upon said magnesium fluoride layer.

16. The method of claim 1 wherein said composition comprising a perfluorocarboxylic acid and N, beta-aminoethyl-gamma-aminopropyltrimethoxysilane is applied to said optical element wherein said optical element surface comprises a layer of inorganic material comprising a mixture of indium oxides and tin oxides, the water repellent coating being formed upon said layer of inorganic material.

* * * * *